United States Patent [19]

Morita

[11] 4,253,742
[45] Mar. 3, 1981

[54] ELECTROCHROMIC DISPLAY CELL

[75] Inventor: Hiroshi Morita, Machida, Japan

[73] Assignee: Toshiba Corporation, Kawasaki, Japan

[21] Appl. No.: 70,706

[22] Filed: Aug. 29, 1979

[30] Foreign Application Priority Data

Sep. 25, 1978 [JP] Japan ................. 53-116710

[51] Int. Cl.³ .............................................. G02F 1/17
[52] U.S. Cl. .................................................. 350/357
[58] Field of Search ........................ 350/357; 252/408

[56] References Cited

U.S. PATENT DOCUMENTS

| 3,712,710 | 1/1973 | Castellion et al. ............... 350/357 |
| 3,971,624 | 7/1976 | Bruesch et al. .................. 350/357 |
| 4,106,862 | 8/1978 | Bayard ............................ 350/357 |

OTHER PUBLICATIONS

Baukamp et al. "Fast Ionic Conductivity in Lithium Nitride," *Mat. Res. Bull.* vol. 13, pp. 23-32, 1978.

*Primary Examiner*—James W. Davie

[57] ABSTRACT

An electrochromic display cell comprising a display electrode, a counter electrode spaced from and facing the display electrode, and an electrochromic layer deposited on the display electrode, and a solid electrolyte layer conductive to lithium ion disposed between the electrodes. The solid electrolyte layer is formed from materials selected from the group consisting of $Li_3N$, $Li_{2+x}C_{1-x}B_xO_3$, $Li_{4+x}Si_{1-x}P_xO_4$ and $Li_{5+x}Ag_{1-x}Si_xO_4$ where $0<x<1$.

8 Claims, 4 Drawing Figures

ELECTROCHROMIC DISPLAY CELL

BACKGROUND OF THE INVENTION

This invention relates to a solid electrochromic display cell. Such a cell uses an electrochromic material which produces coloration by the application of an electric field.

Well known electrochromic materials are tungsten oxide and biologens. The use of viologens as an electrochromic material is described in U.S. Pat. No. 3,806,229 to Schoot et al. In recent years, these materials have been used for information display devices. A typical structure of a display device comprises: a pair of glass transparent panels; a transparent display electrode on one of the panels; an electrochromic material coating such as tungsten oxide deposited on the display electrode; a counter electrode on the other panel; and, a liquid electrolyte layer such as sulfuric acid filled between the electrochromic coating and the counter electrode. Upon applying an electrical potential across these electrodes, the coating changes from a transparent state to a color state, and the coloration is retained even after removal of the electrical potential. Reversing the polarity will cause the electrochromic layer to bleach to a colorless state.

Electrochromic display cells have advantages which are inherent of a passive display; that is, observation without eye fatigue is achieved and wider visual angles are permitted while viewing the cell. Furthermore, electrochromic cells are able to retain coloration after removal of the electrical potential. The cells of the prior art, however, have the disadvantage of reduced operational life when a liquid electrolyte is used. A typical reason for reduced life is that after numerous applications of electrical potential, the electrochromic coating or layer becomes eroded (i.e., peeled and dissolved). Erosion is particularly promoted at those portions of the electrochromic layer located on the edge of the display electrode where the electric field concentrates.

As the electrochromic layer thereby peels, the display electrode will be exposed causing it to dissolve into the liquid electrolyte. As a result, the connection of the electrode to outside driving circuit will be severed and the display cell will lose its information display function.

Several methods have been practiced in the prior art to prevent the electrochromic coating from eroding into the liquid electrolyte. For example, an erosion proof insulating layer has been used to cover the electrochromic coating portion. The insulating layer protects the electrochromic layer since any erosion that occurs will first affect the insulating layer. However, after the insulating layer has eroded, erosion of the electrochromic layer will then occur. A further example is the use of a liquid electrolyte saturated with a solid electrochromic material; after the solid material dissolves in the liquid, however, it will subsequently settle and return to its original solid state. While in this solid state the above mentioned problem of erosion will then occur. Consequently, this method does not resolve the problem, it merely delays, for a short time, its occurrence.

On the other hand, the use of an electrochromic display cell having a solid electrolyte is free from the disadvantage of liquid electrolyte cells mentioned above. The first type is made of an insulating material such as SiO, $CaF_2$ or $MgF_2$; these insulating materials contain impregnation water as shown in U.S. Pat. No. 3,521,941 (Deb et al). The second type is made of an ion conductive layer such as $\beta$-$Al_2O_3$, AgI or $NaZrSiPO_4$ in which Na ions or Ag ions are used as charge carriers as shown in the following U.S. Pat. Nos. 3,712,710 (Castellion et al), 3,971,624 (Bruesch et al), and 4,106,862 (Bayard). The first type, however, produces instability of the impregnating water by creating ionization; consequently, the water will be contaminated by moisture in the air. Thus, the operation of the cell will be adversely effected. The second type, moreover, requires an undesirably high electric driving potential, and will respond slowly to change the coloration and bleaching of the electrochromic material due to the slow mobility of Na and Ag ions.

The instant invention overcomes the above disadvantages by the use of a lithium (Li) ionic conductive electrolyte. In particular, the instant invention produces an electrochromic display cell having the characteristics of high stability, relatively low driving voltage and quick response. Although Li ionic conductivity has been described in high energy or power density battery systems, no suggestion has been offered for use in other structures or devices. See "Material Research Bulletin", Vol. 13, pp. 23–32, 1978 to Boukamp et al. In fact, this reference specifically points out the limited applications of Li ionic conductivity due to its alleged relatively low stability. The instant invention is directed to the use of $Li_3N$, $Li_{2+x}C_{1-x}B_xO_3$, $Li_{4+x}+Si_{1-x}P_xO_4$ and $Li_{5+x}Ag_{1-x}Si_xO_4$ (where $0 < x < 1$) in an electrochromic display cell and its improved characteristics and performance, including high stability, relatively low driving voltage and quick response.

SUMMARY OF THE INVENTION

It is an object of the present invention to provide a solid electrochromic display cell having high stability.

It is a further object of the present invention to provide a solid electrochromic display cell having relatively low driving voltage.

Still a further object of the invention is to provide a solid electrochromic display cell having quick response.

The aforementioned objects are attained in accordance with the invention by using a solid lithium ion conductive electrolyte layer being formed from materials selected from the group consisting of $Li_3N$, $Li_{2+x}C_{1-x}B_xO_3$, $Li_{4+x}Si_{1-x}P_xO_4$, and $Li_{5+x}Ag_{1-x}Si_xO_4$ where x is between 0 and 1. Namely, one aspect of the invention comprises a display electrode, a counter electrode, an electrochromic material layer deposited on the electrode, a solid lithium ion conductive electrolyte layer in contact with the electrochromic material layer and the counter electrode. An electric potential supplied to both the counter electrode and display electrode creates an electric field across the layers.

For example, lithium nitride ($Li_3N$) provides as a solid electrolyte an ion conductivity of $1.2 \times 10^{-3} (\Omega \cdot cm)^{-1}$ at room temperature; this conductivity is approximately 2-3 powers higher than other solid electrolytes which can be used. Consequently, when used in a display cell, the $Li_3N$ layer easily injects Li ions into the electrochromic layer. Furthermore, Li ions have the second highest mobility. Therefore, the mobility of the Li ions as charge carriers from the lithium nitride electrolyte layer through the electrochromic layer (e.g., $WO_3$) provides a display cell exhibiting quick response in both coloration and bleaching. In fact, the resulting response is much faster than compared with the response of display cells utilizing the prior art teaching of Na or Ag ion carriers.

Although the Li ionic electrolyte layer of the instant invention can be made thicker than with the layers of the prior art (e.g., sodium or silver ions) due to the higher mobility of Li ions, it is preferable to use a thin layer to maintain a fast response time and lower potential difference required between the electrodes. The lithium ion conductive electrolyte according to the instant invention is formed by a thin film forming process, such as evaporation or ion plating.

DETAILED DESCRIPTION OF THE PREFERRED EMBODIMENT

Figure 1:
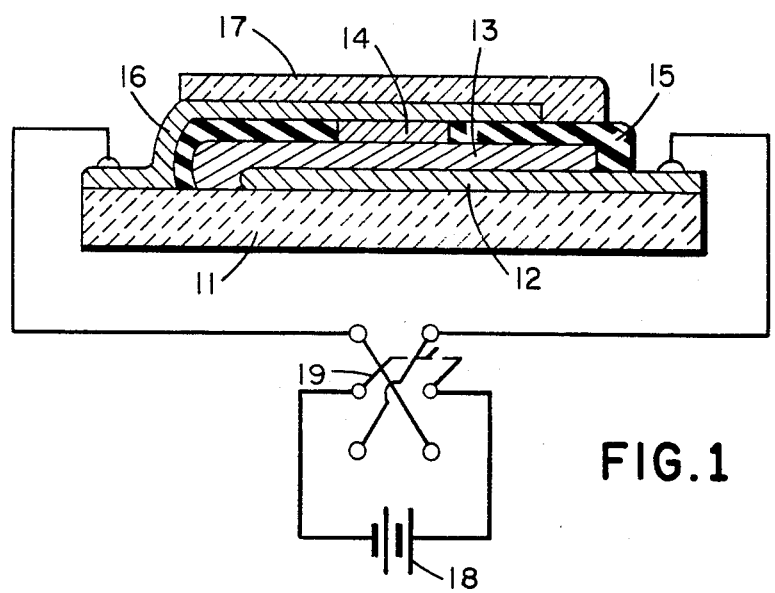
FIG. 1 is a sectional view of one preferred embodiment of the invention.

Referring now to the drawings, wherein like reference numerals designate identical corresponding parts of each of the separate embodiment, and more particularly to FIG. 1 thereof; FIG. 1 shows an electrochromic display cell of the invention comprising a substrate 11 of alumina ceramic plate and a transparent counter electrode layer 12. Counter electrode layer 12 consists of an oxide mixture of indium and tin and is deposited on substrate 11, at a thickness of approximately 1 $\mu$m, by means of sputtering. On this counter electrode layer 12, an ion conductive layer 13 of $Li_3N$ is deposited by either sputtering, evaporating or ion plating. The thickness of the electrolyte layer is from 1000Å to 3000Å. In forming the $Li_3N$ layer, a process is utilized whereby $Li_3N$ is evaporated on the counter electrode 12 in an atmosphere of nitrogen gas of approximately $10^{-4}$ to $10^{-3}$ Torr. The $Li_3N$ layer also may be deposited by evaporating pure Li metal in a nitrogen atmosphere. The solid layer obtained has high ionic conductivity.

Next, an electrochromic layer 14 of $WO_3$ is heated in a vacuum by either a resistance heating technique or an electron beam and then evaporated on a portion of the solid electrolyte layer 13 while in the vacuum. Layer 14 is formed to have a thickness of approximately 300Å.

A transparent insulating layer 15 of silicon oxide is then deposited on the remaining portion of the solid electrolyte layer 13 which has not been covered by the electrochromic layer 14. The thickness of insulating layer 15 is made equal to electrochromic layer 14, that is, it has a thickness of approximately 3000Å. Deposited on the upper surface of layer 14 and on the upper surface of a portion of layer 15 is a transparent electrically conductive layer 16. Layer 16 consists of indium-tin oxide having a thickness of approximately 200Å. Layer 16 is the display electrode for the electrochromic display cell and can be deposited, for example, by a sputtering technique. Finally, a protecting coating 17 of epoxy resin or acrylic resin is applied over the aforementioned layers. This protective coating also adds strength to the display cell. As can be seen from FIG. 1, each outer terminal of electrodes 12, 16 is connected to a D.C. source 18 through DPDT switch 19. If display electrode 16 is at negative potential to counter electrode 12 (i.e., switch arm in upper position) coloration is produced (i.e., the electrochromic layer 14 turns blue).

In practical use, when the switch arm is in the upper position and voltage is applied to the electrodes, a blue coloration will be produced after approximately 400 m sec. The color produced will have a high contrast to the white background of substrate 11. However, when the voltage polarity is reversed by moving the arm of switch 19 in the opposite direction (i.e., switch arm in lower position), the coloration of the electrochromic layer 14 will disappear (i.e., bleaching). This bleaching will occur in approximately the same time required for coloration. In testing, the display achieved good results without adversely affecting coloration after alternately switching the cell between coloration and discoloration for $10^6$ times. In particular, life testing was performed by applying $\pm 3v$ rectangular waves to the cell at a frequency of 1Hz. Instead of $WO_3$, other compounds can be substituted for the electrochromic material; for example, the following compounds can be used: $MoO_3$, $V_2O_5$ or mixtures thereof.

Other lithium solid electrolytes which can be utilized to achieve the improved operational characteristics of the instant invention are: $Li_{2+x}C_{1-x}B_xO_3$, $Li_{4+x}Si_{1-x}P_xO_4$ and $Li_{5+x}Ag_{1-x}Si_xO_4$, where $0<x<1$. These materials can be deposited on the cell by the aforementioned process utilized for $Li_3N$.

Figure 2:
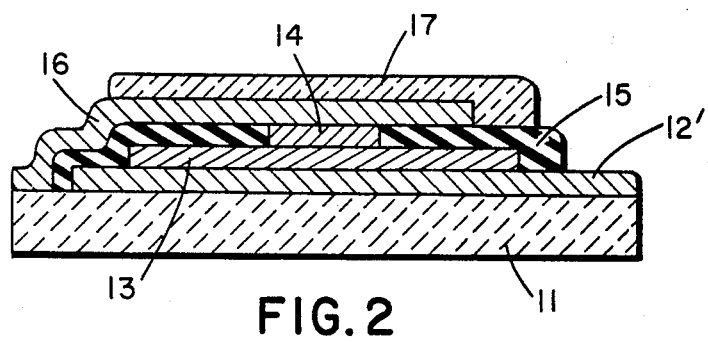
FIG. 2 is a sectional view of another embodiment of the invention.

In the embodiment of FIG. 2, a counter electrode 12' is shown; this electrode is made of a metal having a highly reflective surface such as Au, Ag, or Cu, Al, bronze or an alloy thereof. Except for metal counter electrode 12', this embodiment is similar to the embodiment of FIG. 1. In forming the embodiment of FIG. 2, the corresponding method used for forming each respective layer discussed above regarding FIG. 1 can be used. The thickness of each respective layer is the same as its corresponding layer in FIG. 1. For example, counter electrode 12' has a thickness of approximately 1 $\mu$m. The use of a metal counter electrode 12' offers a further improvement since it provides a background for the display. Consequently, better contrast is obtained which facilitates observation by the user.

Figure 3:
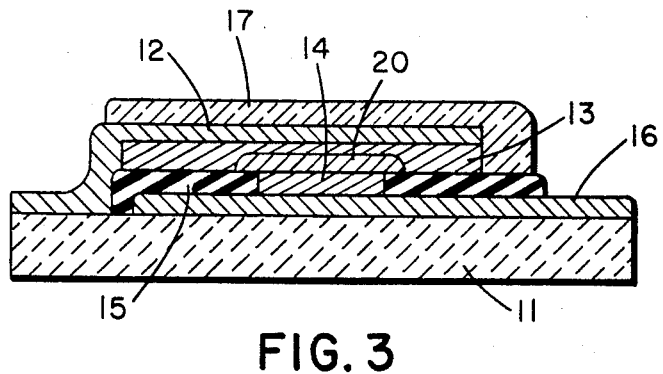
FIG. 3 is a sectional view of a further embodiment of the invention.

The embodiment of FIG. 3 has certain elements corresponding in size and shape to those shown in the previous embodiments but having a reverse relationship. In particular, display electrode 16 is deposited on substrate 11, rather than on the electrolyte layer, while counter electrode 12 is deposited on electrolyte 13, rather than on the substrate. In addition, the embodiment of FIG. 3 contains an additional layer 20 which provides further improved results, as discussed below.

In forming the embodiment of FIG. 3, the corresponding methods used for forming each layer discussed above regarding FIG. 1 can be used. Deposited on substrate 11 is display electrode 16. Next, electrochromic layer 14 of $WO_3$, for example, is heated in a vacuum by either a resistance heating technique or an electron beam and then evaporated on a portion of display electrode 16 while in the vacuum. Electrochromic layer 14 has a thickness of approximately 3000Å. A transparent insulating layer 15 of silicon oxide is then deposited on the remaining portion of the display electrode 16. The thickness of insulating layer 15 is made equal to the electrochromic layer 14, that is, it has a thickness of approximately 3000Å. Deposited on electrochromic layer 14 and on a portion of insulating layer 15 is a thin ion transmissive reserving layer 20. This reversing layer consists of SiO$_2$ having a thickness of up to 200Å and is deposited by a sputtering technique.

The solid electrolyte layer 13 is then deposited, as previously mentioned, by either sputtering, evaporating or ion plating techniques. The thickness of the electrolyte layer is from 1000Å to 3000Å. Counter electrode 12 is then deposited on the solid electrolyte layer 13. Electrode 12 is a transparent electrode conductive layer consisting of an oxide mixture of indium and tin and having a thickness of approximately 1 μm. Finally, protective coating 17 of epoxy resin or acrylic resin is applied over the aforementioned layers.

The structure of FIG. 3 has an advantage in forming the cell since the display electrode 16 and the electrochromic layer 14 are deposited on the substrate 11 before the solid electrolyte layer 13 is applied. Since the quality of layer 13 can be adversely effected by heat, the electrochromic layer 14 can be deposited by the heating techniques mentioned above regarding FIG. 1 without effecting electrolyte layer 13.

As mentioned above, the structure of FIG. 3 further contains a thin ion transmissive reserving layer 20 which is situated between the WO$_3$ layer 14 and the solid electrolyte layer 13. This reserving layer prevents color spotting caused by llithium migration, that is, this layer absorbs and uniformly releases lithium ions given off by the solid electrolyte layer. The thin film 20 also may be applied to any of the preceding embodiments. Rather than SiO$_2$, reserving layer 20 can also be made of a polycrystaline WO$_3$ layer evaporated and heated in air at temperatures of 350° C. or greater.

Figure 4:
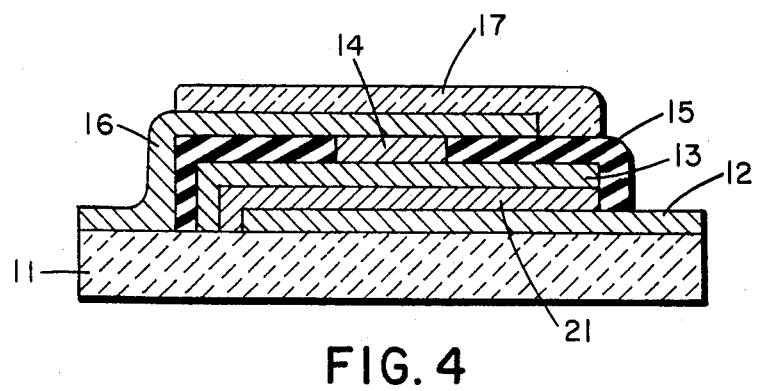
FIG. 4 is a sectional view of still a further embodiment of the invention.

Reference is now made to FIG. 4. In forming the embodiment of FIG. 4, the corresponding methods used for forming each respective layer discussed above regarding FIGS. 1–3 can be used. The thickness of each respective layer is the same as its corresponding layer in FIGS. 1–3. The counter electrode 12 can either be transparent, as shown in FIG. 1, or a metal having a highly reflective surface, as shown in FIG. 2 (i.e., 12′).

In the embodiment of FIG. 4, there is shown a lithium ion reserving layer 21 of lithium metal, extending substantially the entire length of the cell, and situated between the counter electrode 12 and the solid electrolyte layer 13. Layer 13 absorbs and releases the lithium ions given off by the solid electrolyte layer. Clearly, the location of the reserving layer 21 is different than the location of layer 20 shown in FIG. 3. The location of layer 21 protects electrode 12. That is, the lithium ions are apt to collect at the electrode side of electrolyte layer 13. Consequently, electrode 12 will be eroded at various discrete areas along the surface of the electrode by the action of the Li ions combining chemically with the electrode at these areas. The reserving layer 21 protects these effects of Li migration on electrode 12 since it separates electrolyte 13 and electrode 12. Li ions which move toward electrode 12 are quickly absorbed and uniformly released to prevent the erosion at discrete areas.

Besides Li, layer 21 can be made of Li-Si alloy, Li-Al alloy, Li$_x$WO$_3$ (where $0<x<1$), or a combination thereof. Layer 21 is deposited on counter electrode 12 by evaporating or sputtering and has a thickness of 300Å to 5000Å, and more particularly, 1000Å to 2000Å.

The background color of the cell depends on the color of the counter electrode layer used or, in FIG. 3, the color of display electrode 16. If a reserving layer is used, the background color depends upon the color of the reserving layer. Moreover, background colors can be obtained by combining a coloring material or pigment in the solid electrolyte layer, the electrochromic layer or the area therebetween. If the color exhibited by the electrochromic layer is the same as the background color, it is desirable to provide a further background color behind the electrochromic layer. For example, such a further background layer is formed by either depositing an ion penetrating enamel layer on the surface of the solid electrolyte layer or applying a colored organic porous sheet on the surface of the electrolyte layer. The use of an amorphous silicon enamel layer, for example, will exhibit a red-brown background. This ion penetrating enamel layer is deposited by sputtering, evaporating or a chemical vapor depositing method.

What is claimed as new and desired to be secured by Letters Patent of the United States is:

1. In an electrochromic display cell comprising
   a display electrode;
   a counter electrode facing said display electrode;
   an electrochromic layer and an ion conductive solid electrolyte layer situated between said electrodes, the improvement comprising said ion conductive solid electrolyte layer being formed from materials selected from the group consisting of Li$_3$N, Li$_{2+x}$C$_{1-x}$B$_x$O$_3$, Li$_{4+x}$Si$_{1-x}$P$_x$O$_4$ and Li$_{5+x}$AG$_{1-x}$Si$_x$O$_4$ where $0<x<1$, wherein the charge carrier through said electrolyte layer is lithium ion.

2. An electrochromic display cell according to claim 1 wherein said ion conductive solid electrolyte layer has a thickness from about 1000Å to about 3000Å.

3. An electrochromic display cell according to claim 1 wherein said display electrode comprises a transparent layer and said counter electrode comprises a metal having a highly reflective surface.

4. An electrochromic display cell according to claim 1 wherein said electrochromic layer comprises tungsten oxide.

5. An electrochromic display cell according to claim 1 wherein said cell further comprises a lithium ion reserving layer means, contiguous with said ion conductive solid electrolyte, for absorbing and releasing lithium ions given off by said ion conductive solid electrolyte.

6. An electrochromic display cell according to claim 5 wherein said reserving layer means is further contiguous with said electrochromic layer.

7. An electrochromic display cell according to claim 5 wherein said reserving layer means is further contiguous with said counter electrode.

8. An electrochromic display cell according to claim 5 wherein said reserving layer means being formed from materials selected from the group consisting of Li$_x$WO$_3$ (where $0<x<1$), polycrystaline WO$_3$, SiO$_2$, Li-Si alloy, and Li-Al alloy.

* * * * *